(12) United States Patent
Ohashi

(10) Patent No.: US 6,580,373 B1
(45) Date of Patent: Jun. 17, 2003

(54) CAR-MOUNTED IMAGE RECORD SYSTEM

(75) Inventor: Tamaki Ohashi, Tokyo (JP)

(73) Assignee: Tuner Corporation (JP)

( * ) Notice: Subject to any disclaimer, the term of this patent is extended or adjusted under 35 U.S.C. 154(b) by 0 days.

(21) Appl. No.: 09/450,157

(22) Filed: Nov. 29, 1999

(30) Foreign Application Priority Data

Nov. 30, 1998 (JP) .......................................... 10-353786
Nov. 1, 1999 (JP) .......................................... 11-346591

(51) Int. Cl.$^7$ ............................. G08G 1/00; H04N 9/47
(52) U.S. Cl. ................... 340/901; 340/425.5; 340/436; 348/148
(58) Field of Search ................................ 340/901, 903, 340/435, 425.5, 436; 348/148, 149, 143, 135, 113; 701/301; 382/104

(56) References Cited

U.S. PATENT DOCUMENTS

| | | | | |
|---|---|---|---|---|
| 4,843,463 A | * | 6/1989 | Michetti | 358/108 |
| 5,027,200 A | * | 6/1991 | Petrossian et al. | 358/103 |
| 5,121,200 A | * | 6/1992 | Choi | 358/103 |
| 5,289,321 A | * | 2/1994 | Secor | 358/149 |
| 5,430,431 A | * | 7/1995 | Nelson | 340/434 |
| 5,680,123 A | | 10/1997 | Lee | 340/937 |
| 5,689,442 A | * | 11/1997 | Swanson et al. | 340/550 |
| 5,815,093 A | * | 9/1998 | Kikinis | 340/937 |
| 5,938,717 A | * | 8/1999 | Dunne et al. | 340/937 |
| 6,218,960 B1 | * | 4/2001 | Ishikawa et al. | 340/901 |

FOREIGN PATENT DOCUMENTS

| | | |
|---|---|---|
| JP | 5-20592 | 1/1993 |
| JP | 5-64124 | 3/1993 |
| JP | 5137144 | 6/1993 |
| JP | 5294188 | 11/1993 |
| JP | 5310078 | 11/1993 |
| JP | 5345547 | 12/1993 |
| JP | 6-79658 | 11/1994 |
| JP | 7-24650 | 5/1995 |
| JP | 7291064 | 11/1995 |

* cited by examiner

Primary Examiner—Donnie L. Crosland
(74) Attorney, Agent, or Firm—Adams & Wilks

(57) ABSTRACT

A vehicle-mounted image record system for ensuring safe driving of a vehicle by recording images of a portion of the vehicle and a surface of a road in the vicinity of the vehicle so as to monitor the driving habits of a driver. The system includes one or more cameras mounted at suitable positions on the vehicle and a recording device for recording the images captured by the cameras. The captured and recorded images include a portion of the vehicle and part of the surface of the road on which the vehicle is driving so as to serve as proof of safe driving in the event of an accident. The system also includes a display for displaying the captured images so that the driver of the car can see objects forward or reverse of the vehicle.

58 Claims, 16 Drawing Sheets

US 6,580,373 B1

CAR-MOUNTED IMAGE RECORD SYSTEM

FIELD OF THE INVENTION

The present invention relates to a car-mounted system for displaying and recording images outside a moving car and an image and running state of the car, and particularly, to a system which provides the driver with information on a running state of the car before the car has an accident, and the recorded material after the car had an accident.

BACKGROUND OF THE INVENTION

In recent years, a car has become one type of vehicle that is a daily necessity for humans. Typically, a driver has to take driving lessons and learn traffic regulations to obtain a driver's license in a driving school before he actually drives his car. The driving school instructs drivers to drive the car with safety and observe traffic regulations. However, after drivers obtain a driving license, they tend to accelerate their car to speeds in excess of legal speed limits, because haste is often given priority to safety. As a result, drivers have traffic accidents. The number of traffic accident is increasing these days, which bring with it the number of cars into a corresponding increase.

The number of the traffic accident is further increasing these days, which bring number of car into increase.

Everybody desires that traffic accidents be avoided. For the above reason, many drivers try to drive safely, sticking on a window of his driver stickers, on which words are written such that "This car is driven at speed less than 80 km per hour on a highway", or "After you, this car is driven aside by traffic rules". However, when a driver drives a car, he or she is closed inside of their car and can not communicate with outer world. For this reason, some have a complete change in their personality when driving and are apt to cause traffic accidents.

When a traffic accident occurs, an inquisition is often made after the accident. Such inquisition is dependent on the witness between the parties. In many case, it is assumed that if the victim is inexperienced or dies after the accident, the assailant often would lay blame on the victim. That is to say, even if the victim was without fault, the evidence has to be proved.

From the above viewpoints, various systems for investigating the driving state of the driver were proposed with use of cars. Such systems are disclosed in Publication Nos. 1993 5)-20592 (Kumagai), 1993-294188, 1993-137144 (Takahashi), and 1993-345547 (Wolfgang) of unexamined japanese patent applications (Kokai).

Publication No. 1993 (Heisei 5)-20592 discloses a system for recording a running state of the car. The system comprises an image capture device for capturing a forward vision from the car as image input information; a controller apparatus for controlling the image capture device such that the image capture device operates at start of an engine, and such that it detects a stop signal from the engine, the controller apparatus having functions of input/output datum on time, speed, acceleration and deceleration; and a record device for recording at least one of the output datum from the controller apparatus. The image capture device of the system is mounted on a dashboard in the car or a surface of a front portion in vicinity of a radiator grill of the car.

The Publication No. 1993 (Heisei 5)-294188 discloses a car-mounted image record system. The image record system includes a camera provided at the rear or front ends of a car for capturing an image of backward or forward scenery from the car; and a display provided in a cabin of car for displaying the captured image on a scope thereof; a car-mounted image record device accommodated in a heat-resistant box for recording the captured image, which was displayed on the scope of the display; and a signal switch circuit for alternately switching the display or the image recording apparatus; an acceleration detection circuit for detecting a mass of quick brake for the car per a predetermined time; and a microcomputer for controlling said signal switch circuit such that the making of the signal switch circuit is allowed for driving the image record device only at time when the microcomputer detected the mass of brake in excess of the predetermined mass, and thereby image signal is inputted to the image record device.

The Publication No. 1993 (Heisei 5)-137144 discloses a system for monitoring an accident by the use of a digital electronic camera. The system includes a digital electronic camera mounted on a ceiling surface above a driver seat of a car for capturing an image of forward scenery from the car during time when the car is running, and a memory card for recording the captured image. After the memory card is filled to capacity, the recorded image is overwritten by new image data. When sudden brake is applied by the driver, a sensor outputs an urgent signal after the detection of the braked state, thereby the digital electronic camera captures the detected location of the braked state. The captured image is recorded at a predetermined intervals of frames, before the system completes the record operation.

The publication No. 1993 (Heisei 5)-345547 discloses a car-mounted observation/monitor system for traffic accidents. The system includes at least one of electronic detection devices mounted above or inside of a front bumper of an car, and a image storage apparatus connected to the electronic detection devises.

As described above, it is apparent that the conventional systems for investigating the driving state of the driver were directed to only the capture of the image of the forward or backward scenery from the car.

Generally, the evidentiary fact of the traffic accident will be testified, based on a finally stopped location or direction, or damage state of objective cars, and wheel tracks on a road. The reason why many of the accidents are caused is that for example, when one car stopped before passing an intersection, another car comes from the right or left side of the intersection, and collides with the stopped car, when one car stopped before entering a main line from a branch line, another car coming from the main line collides with the stopped car, or when one car runs straight on the road, another car comes and collides with the side face of the former. Therefore, most important evidentiary fact is that either of the cars stopped or ran straight.

It is impossible to exactly testify the evidentiary fact, only based on the final stop location or direction, or damage state of objective cars, and wheel tracks on the road. According to the circumstances, the cause of the traffic accident won't be found. In order to testify the evidence that the cars stopped or ran, the movement of the cars have to be found. The movement of the cars can be proved by recording a movement of a part of the cars with respect to the surface of the road. Therefore, the conventional system won't provide the exact testimony.

The conventional systems as described above can capture only an image of a part of the surface of the road on which the car is running. However, the conventional systems provides only a recognition of the movement of an oncoming car with respect to a running car. Therefore, the conventional systems can not always monitor the driving state of the driver to call the driver's attention to dangerous driving. Furthermore, if the car had an accident, the conventional systems can not provide exact testimony in relationship with a direct or first accident or a second accident caused subsequently to the first accident. Particularly, according to the system disclosed in Japanese patent publication No. 1993 (Heisei 5)-294188, in order to capture an image of movement of the driver's car, the sudden brake will have to be detected. The system can not testify the stopped state of the driver.

SUMMARY OF THE INVENTION

Accordingly, considering the above discussed points, an objective of the present invention is to provide a system for monitoring driving state of a car driver. The car-mounted image record system enables monitoring and record of the car of the driver. Thereby, the car-mounted record system provides control of risky driving of the driver. As a result, the driver always will pay attention to safe driving habits.

Furthermore, if the driver is driving safely before his car has an accident, the car-mounted image record system will prove this. Therefore, the driver can take a reliable drive.

Consequently, when the car mounts the car-mounted image system, the car will actually be called a safely-driven-car. Although the driver has to spend much money on purchasing the car-mounted image record system, such money is not comparable to his life.

It can be said that if all of cars have the car-mounted image system, fewer no car accidents will be caused anywhere in the world. This is a final objective for the present invention, and the applicant's desire.

The system includes an image capture until mounted on suitable positions of a car for capturing images of scenery outside of the car, the captured image including images of a part of the automobile and the surface of the road. The captured images are displayed on a display of a monitor device in front of a driver, while the image data is always recorded on a record medium of the image record device, and stored in the image record device for providing evidentiary facts, and thereby the dangerous driving of the driver is always monitored. The record device is prevented from breakage caused by the accident, with the use of a protective box with excellence in mechanical strength. The image capture device captures an images of a part of the car of the driver, and a surface of a road in relationship with the car. The captured image is continuously recorded on or stored in the record medium of the image record device.

Furthermore, when the image of the surface of the road in relationship with the car is captured by the image capture device, the image capture device captures the image of the surface of the road extending from the vicinity around the car to the underside of the car. The movement of the car of the driver is exactly proved by the captured image.

The image capture unit comprises a camera disposed in the backward and downward directions at front portion on the side of the car, or disposed in the forward and downward directions at rear portion on the side of the car. In addition, the image capture unit comprises cameras disposed at the front and rear portions of a body of the car or/and disposed at the right and left portions of the body of the car.

Furthermore, the image capture unit comprises a camera for front vision for capturing an image of forward scenery from the car, a camera for rear vision for capturing an image of backward scenery from the car, or a camera for side vision for capturing an image of sideward scenery from the car, each of the captured images including the image of a part of the car. Preferably, the camera for front vision, the camera for rear vision, or the camera for side vision is disposed on opposite sides of the car, respectively.

Furthermore, the image capture unit comprises a camera for front vision for capturing an image of scenery outside of the car, the captured image including forward scenery from the car, and a camera for rear vision for capturing an image of scenery outside of the car, the captured image including backward scenery from the car. Particularly, the camera for front vision, and the camera for rear vision are disposed at the front and rear portions on the opposite side of the body of the car so as to capture wider image of scenery at the side area from the car.

Furthermore, the captured image is displayed on the display of the monitor device, so that the driver can check the operation of the car-mounted image record system.

The image record unit comprises an adapter for compounding images captured by the cameras, and a record device for recording or storing the captured images of the image capture devices. All of the captured images are simultaneously displayed on a scope of the display of the monitor device. The scope of the display is divided into a plurality of areas with same size in accordance with the number of the camera. The monitor device includes a selection switch for selecting an image from the images captured by the cameras so as to cause the image to be displayed on the display of the monitor device.

Furthermore, the car-mounted image record system includes a date/time information write device for additionally writing information on date and time to the images captured by the image capture devices.

DESCRIPTION OF PREFFEFED EMBODIMENT

Figure 1:
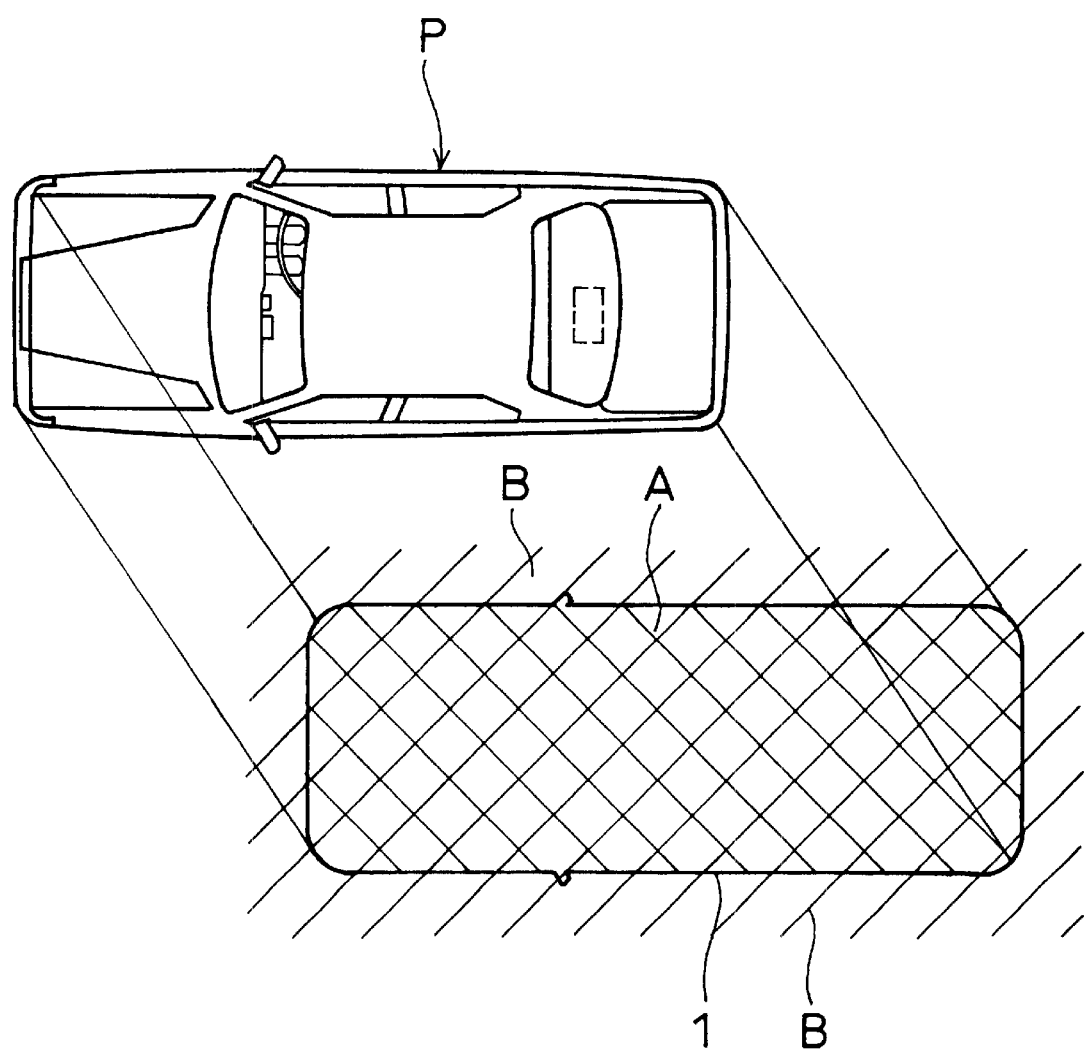
FIG. 1 is a view illustrating an right under and vicinal areas of a car.

Referring now to the drawings, description of embodiments according to the present invention will be made hereinafter.

Embodiment 1

FIG. 1 shows an embodiment according to the present invention. A driver is driving a car P. The car P includes a large-sized, stock, compact, sub compact, and custom-made cars. A lateral rectangular outline 1 denotes an outline of the car P (a passenger car) as projected just above by parallel rays. The lateral rectangular outline 1 surrounds an area A shown in cross oblique lines. The area A is just under the car. The area A is surrounded by an area B shown in unidirectional oblique lines about the lateral rectangular outline 1. The area B is in the vicinity of the car on a road.

Figure 2:
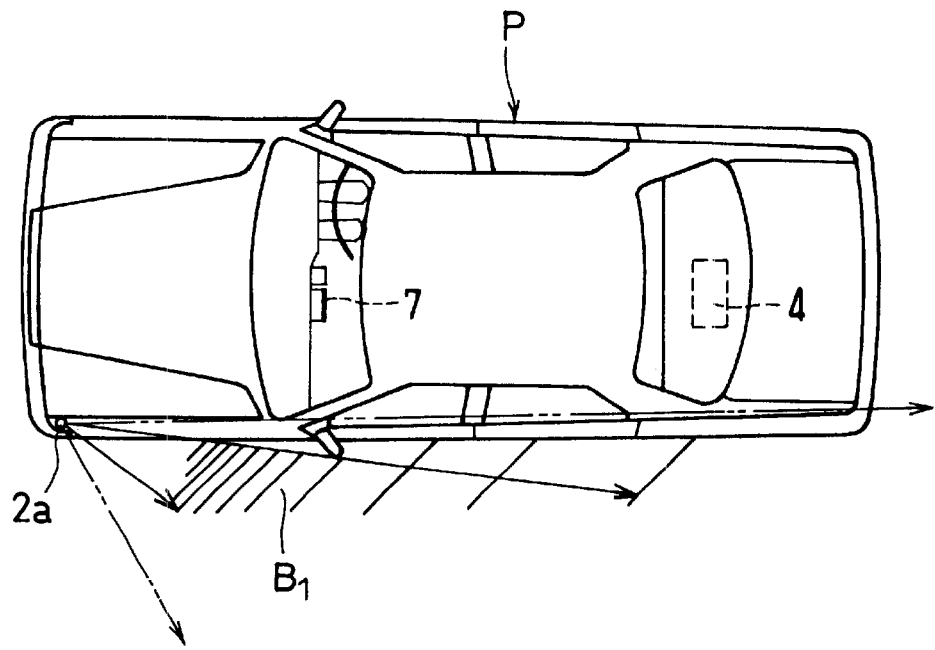
FIG. 2 is a plan view illustrating a car according to a first embodiment of the present invention.
Figure 3:
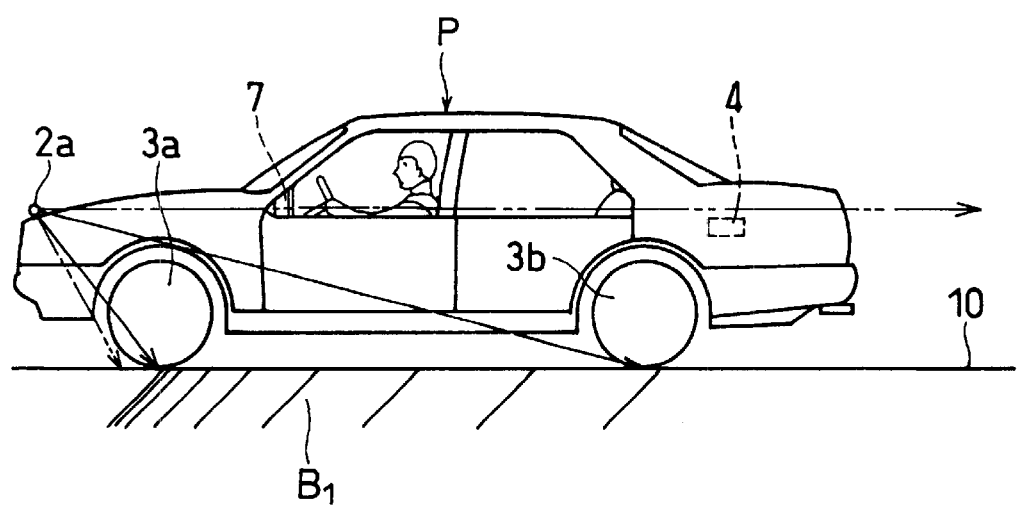
FIG. 3 is a side view illustrating a car according to a first embodiment of the present invention.

FIGS. 2, and 3 shows a plan, and side views according to a first embodiment of the present invention, respectively. The car P has a single CCD camera 2a mounted in the rearward and downward directions on the upper surface at a leading end of the front portion thereof, the camera protruding sideward from the upper. The position for mounting of the CCD camera 2a is not limited to the left side. The car shown in the drawings is Japanese one. If the car P has a left-side steering wheel, the CCD camera 2a may be mounted on a right upper surface at a leading end of a front portion of the car P. The single CCD camera 2a is generally used for a video camera, and a digital camera, and etc. The single CCD camera 2a has an angle of view of about 60 degree.

With the construction, since the CCD camera 2a is mounted in the rearward and downward directions on the front portion of the car P, the camera 2a can capture a wide area on a surface of a road in vicinity of the driver's car (as indicated by a two-dot chain line and an arrow), and an area B1 in vicinity of a left and front wheel 3a (as indicated by a continuous line arrows and oblique lines).

The angle of view of the CCD camera 2a is not limited to 60 degree. However, considering the distinct image and the field of vision in vicinity of the wheel 3a with respect to the mounted position, a simple adjustment in mounting, and deviation of the CCD camera caused by the vibrated car, as time passed, the preferable and effective angle is at 50 to 85 degree. The angle of view of the CCD camera can be optionally selected. That is, when the CCD camera provides the angle of view in a wide field, the wide image at the close point will be captured. However, when the angle of view of the CCD camera has one in a narrow field, the image at the remote point will be captured with enlargement. Therefore, the angle of view of the CCD camera can be freely set in accordance with the mounted position of the CCD camera.

Alternatively, the single CCD camera 2a may be mounted on a side mirror protruding beyond a side face of a body of the car P. In this case, the CCD camera 2a enables the capture of the image of the front wheel 3a as well as the image in relationship of the car P with the surface of the road in vicinity of the car P.

Preferably, the single CCD camera 2a may be provided with a cleaning device for cleaning a spot surface of a lens of the CCD camera 2a, not shown in the drawings. In addition, the single CCD camera 2a may be accommodated in a waterproof covering case, and the adjustment in the capture direction of the image can be optionally made with respect to the interior or exterior of the covering case.

Figure 4:
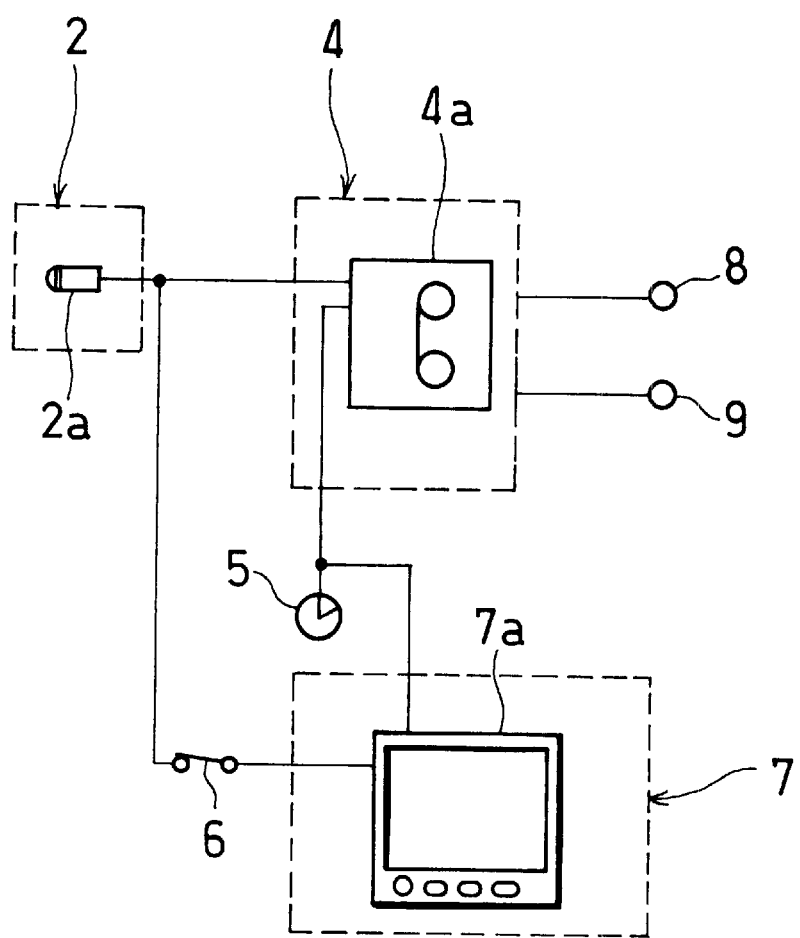
FIG. 4 is a block diagram of the car-mounted image record system according to a first embodiment of the present invention.

FIG. 4 is a schematic view of the car-mounted image record system according to the present invention. The single CCD camera 2a corresponds to an image capture device represented by a numeral reference 2. Numeral reference 4 denotes an image record unit. The image record unit records the captured image of the image capture device 2.

The captured image of the image capture device is recorded or stored in a record medium such as films, video tapes, photomagnetic discs, and semiconductor memories. Other media may be used in the image record unit 4. The image record device 4 is disposed around a rear seat of the car P. Numeral reference 5 denotes a date/time information write device for writing information on a date and time to the captured image to cause the date/time information-write image to be recorded on or stored in the record medium of the image record unit 4. Furthermore, the captured image of the image capture device 2 also can be displayed through a switch 6 on a display 7a of a monitor device disposed on for example, a dashboard of the car P.

Figure 5:
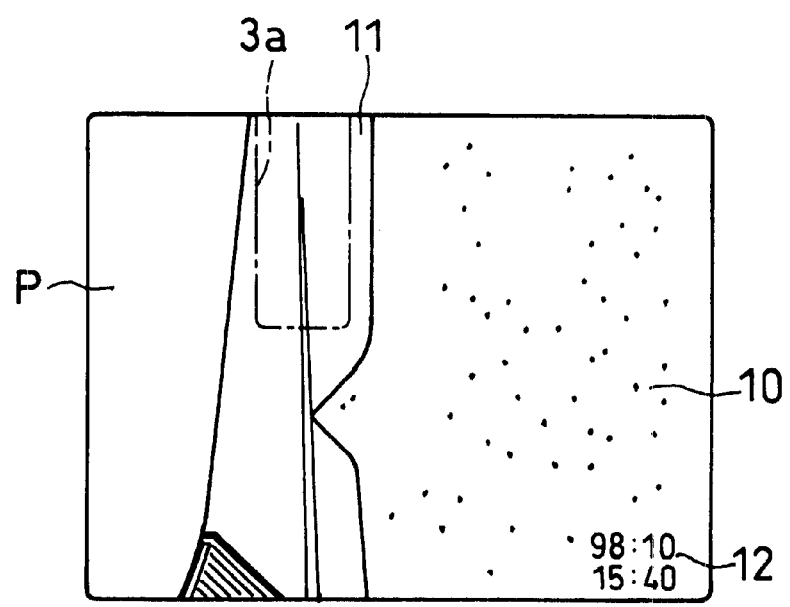
FIG. 5 is a view illustrating a displayed image on a display according to a first embodiment of the present invention.

Description now will be made in detail in relationship with the displayed image on the display 7a of the monitor device 7. Referring with FIG. 5, the displayed image on the display 7a is shown. According to the image, there is displayed a part of the car P, a part of a fender 11 for covering a front wheel 3a of the car P, and a surface of the road 10. In addition, the date and time information 12 is numbered at the lower position on the right side of the image frame.

Preferably, the image record unit 4 comprises a pair of image record devices, one image record device having an simple construction, the image record device comparatively facilitating work such as ejection and change of the record medium, and transportation of the device, another image record device being accommodated in a protective box with excellent mechanical strength similarly to a box used for protecting a voice recorder of an airplane, the airtight interior of the protective box being slightly depressurized.

Looking back to FIG. 4, the image record unit 4 is connected to an automatic drive element 9, which is driven at start-up of an engine of the car P for operating the image record device 4. When the image record device 4 starts operation, the image of the scenery outside of the car P is captured by the image capture device 2. The captured image is recorded on or stored in the record medium of the image record device 4, while the captured image is also displayed on the display 7a of the monitor device 7 through the switch 6 conducting as requested. Then, the date/time information is written on the image by date/time information device. Thereby, the driver can examine the operation of the image capture device 2, and make an adjustment in the captured direction of the image prior to driving. In addition, the driver can take attention into safety of right and left sides, while putting the car P in the garage.

The image capturing device 2 captures the image in relationship the car P with the surface of the road in vicinity of the car P during continued running of the engine. The captured image is also recorded on or stored in the image record device 4 at same time. The operations of capture and record/storage continue for a predetermined time after the engine is killed. After a predetermined time passed, the capture and record/storage operations stop automatically.

Additionally, the capture and record/storage can be manually operated through a manual operation element 8. That is, the driver can look at the image which is captured by the image capture device 2 and displayed on the display 7a, without starting the engine of the car P. At the same time, the captured image is recorded on or stored in the image record device 4. Therefore, the driver always can know the state of the captured image of the image capture device 2, and wither the car-mounted image record system is down or not.

When the driver starts the engine of the car P, the image capture device 2 starts the capture of new image. The image record device records or stores the new image in the record medium, whose record area succeeds to that of the image captured by the image capture device 2 during the predetermined time when the engine is killed. The image record device contains a plurality of record medium therein. If one of the record media of the image record device approaches approximately to the filled capacity, next record medium is started to record the captured image for a predetermined time period.

That is, the image captured by the image capture device 2 is recorded on or stored in the plurality of record media of the image record device without a break. Therefore, if the car P of the driver has an accident, the cause of the accident will be investigated by the reproduction of the record media.

Additionally, when the engine of the car P is killed, the image record device of the image record unit 4 can reproduce the recorded image to be displayed on the display 7a of the monitor apparatus 7 mounted on the car P. Thereby, the driver can examine the recording or storing state of the image record device of the image record unit 4 before driving the car P.

Further, additionally, it will be understood that one of the image record device of the image record unit 4 is accommodated in the protective box with excellent mechanical strength, as described above.

If the car P of the driver has an accident, the investigation of the accident can be suitably made by use of one of the image record devices of the image record unit 4. Therefore, the state will be found in relationship of the car P with the surface of the road in vicinity of the car P.

As described above, the CCD camera 2a can be arranged at anywhere of the car P in accordance with the change in the capture direction and the angle of view thereof. Therefore, the captured image can be obtained in relationship of the car P with the surface of the road in vicinity of the car P. In addition, the CCD camera 2a is directed so that an image of the car P is partially captured. Examples of the mounted CCD camera 2a will be described hereinafter. As described above, the CCD camera 2a is mounted at opposite side to the driver seat. All of the following examples and drawing for describing them are applied to Japanese car. That is, if the described car P is a left hand-drive one, it is observed that the CCD camera 2a is mounted on corresponding location to the examples at the right side of the car P.

Figure 6:
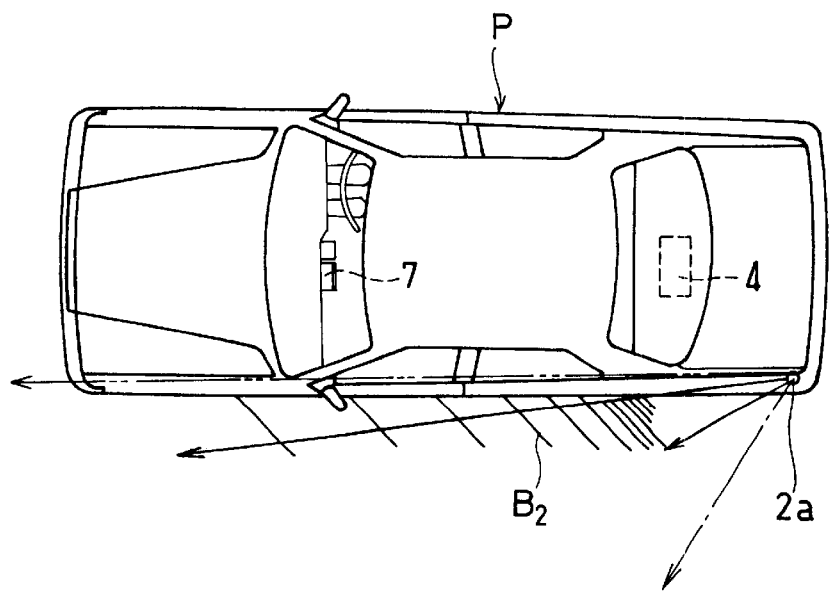
FIG. 6 is a top view illustrating a car mounting the CCD camera, relating to a second arrangement according to the first embodiment of the present invention.
Figure 7:
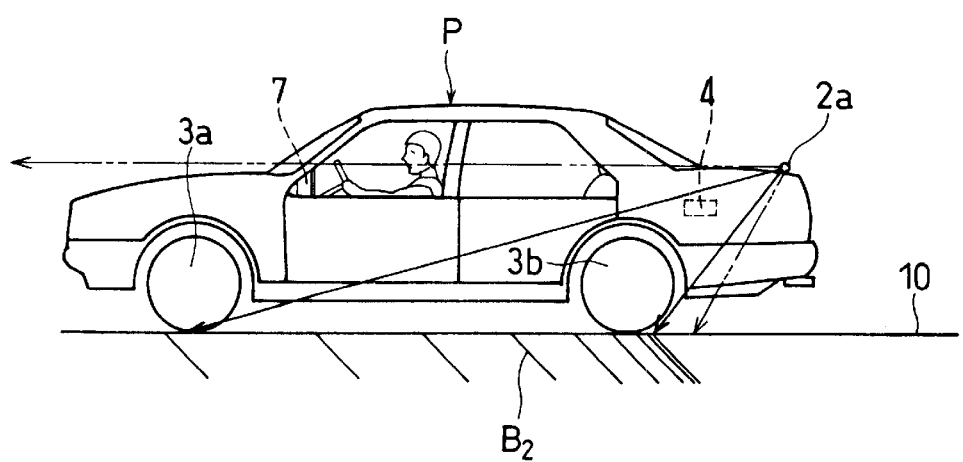
FIG. 7 is a side view illustrating a car mounting the CCD cameras, relating to a second arrangement according to the first embodiment of the present invention.

FIGS. 6 and 7 are a top plan view and a side view illustrating a second example for mounting of the CCD camera 2a, respectively. The CCD camera 2a can be mounted in the forward and downward directions on the upper surface of the rear portion on the left side of the car P, the CCD camera 2a protruding from the side edge of the rear portion. The CCD camera 2a can capture an image, the image including the left rear wheel 3b and a surface of a road in vicinity of the left rear wheel 3b. In addition, the CCD camera 2a is directed to cause an image of the car P of the driver to be partially captured.

Figure 8:
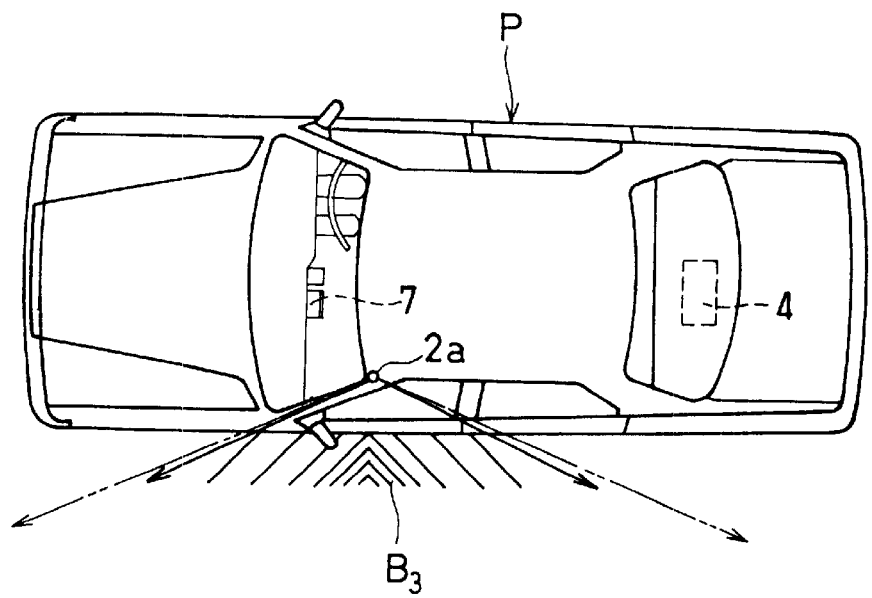
FIG. 8 is a plan view illustrating a car mounting the CCD camera, relating to a third arrangement according to the first embodiment of the present invention.
Figure 9:
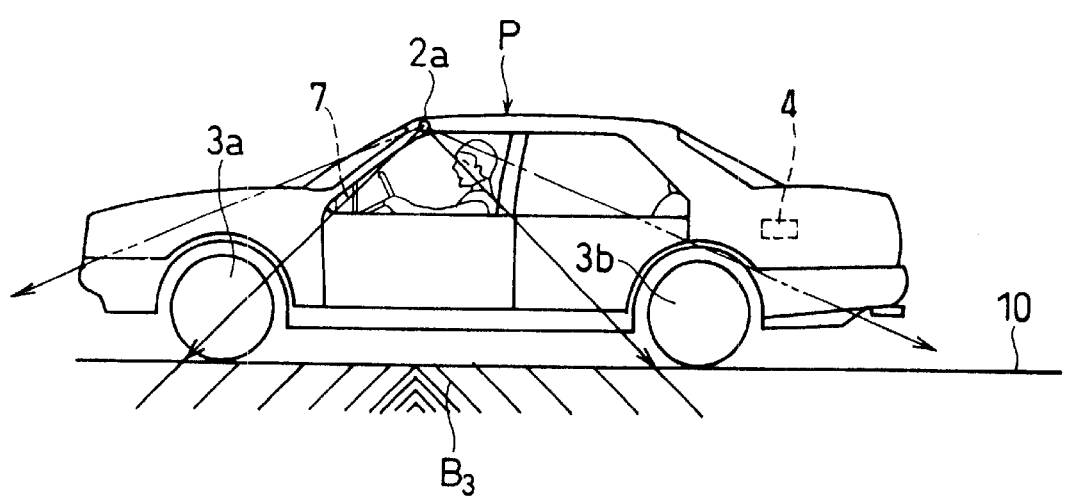
FIG. 9 is a side view illustrating a car mounting the CCD camera, relating to a third arrangement according to the first embodiment of the present invention.

FIGS. 8 and 9 are a plan view and a side view illustrating a third example for mounting of the CCD camera 2a, respectively. The CCD camera 2a is mounted in the downward direction on the side surface on the left side from the upper surface at the front portion of a roof surface of the car P.

Figure 10:
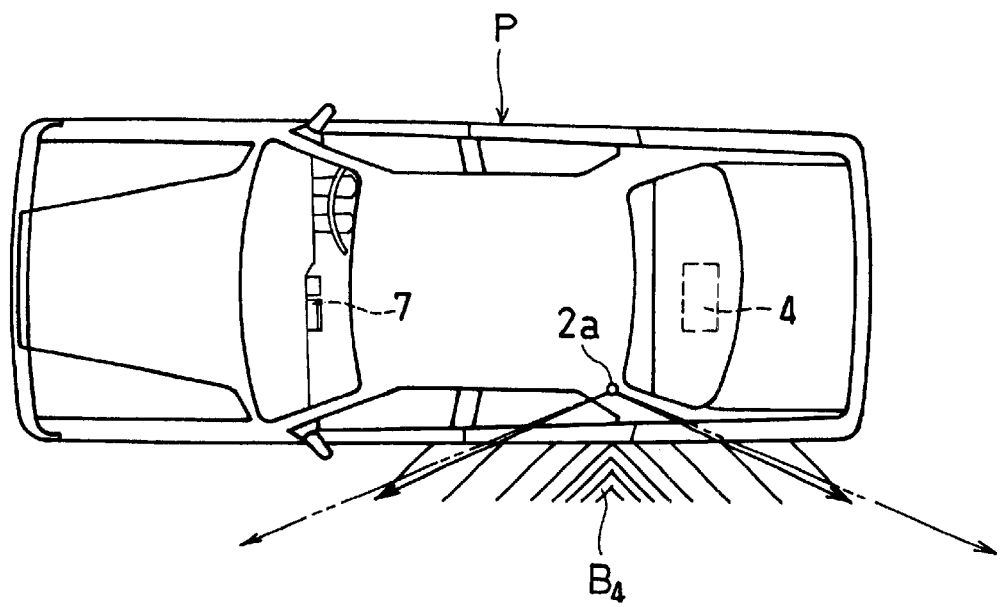
FIG. 10 is a top view illustrating a car mounting the CCD camera, relating to a fourth arrangement according to first embodiment of the present invention.
Figure 11:
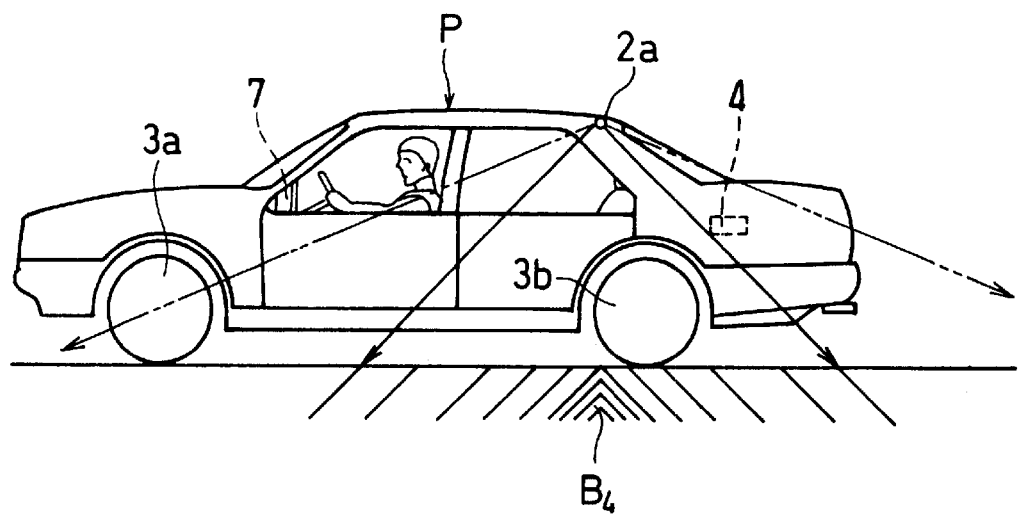
FIG. 11 is a side view illustrating a car mounting the CCD camera, relating to a fourth arrangement according to the first embodiment of the present invention.

FIGS. 10 and 11 are a plan and a side view illustrating a fourth example for mounting of the CCD camera 2a, respectively. The CCD camera 2a is mounted in the downward direction on the side surface on the left side from the upper surface at the rear portion of the roof surface of the car P.

Figure 12:
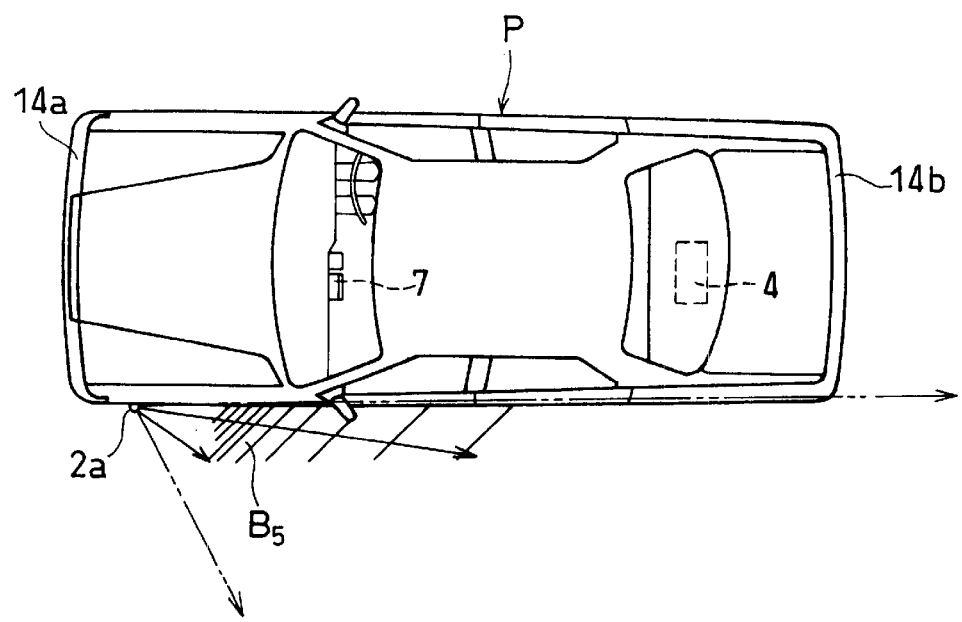
FIG. 12 is a top view illustrating a car mounting the CCD camera, relating to a fifth arrangement according to the first embodiment of the present invention.
Figure 13:
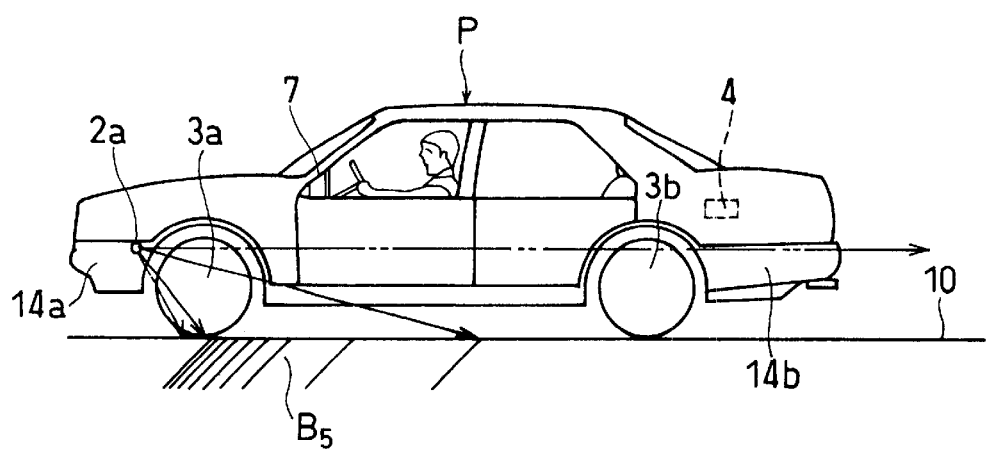
FIG. 13 is a side view illustrating a car mounting the CCD camera, relating to a fifth arrangement according to the first embodiment of the present invention.

FIGS. 12 and 13 are a plan and a side views illustrating a fifth example for mounting of the CCD camera 2a, respectively. The CCD camera 2a is mounted in the rearward and downward directions about the front bumper 14a on the left side of the car P.

Figure 14:
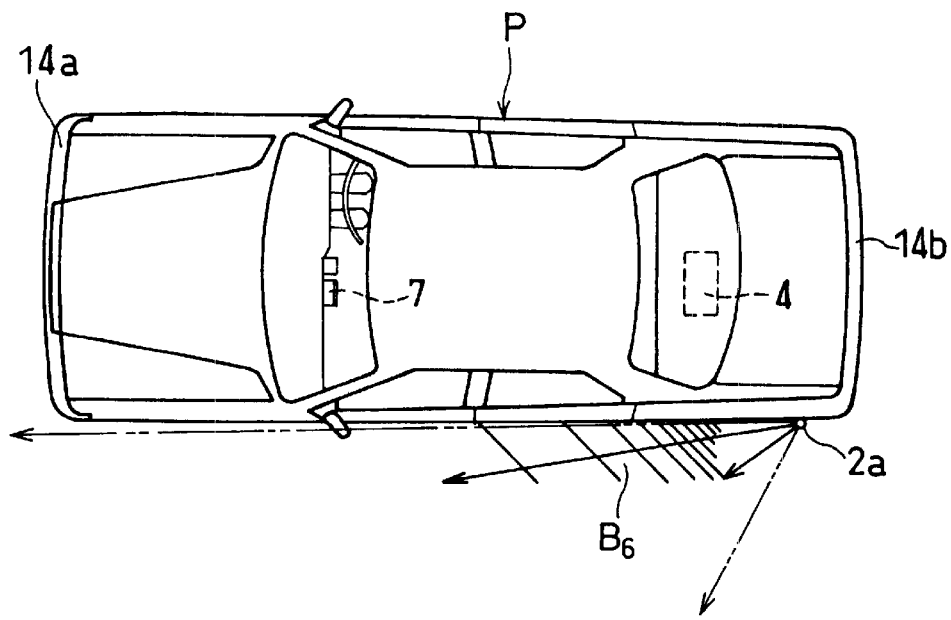
FIG. 14 is a top view illustrating a car mounting the CCD camera, relating to a sixth arrangement according to the first embodiment of the present invention.
Figure 15:
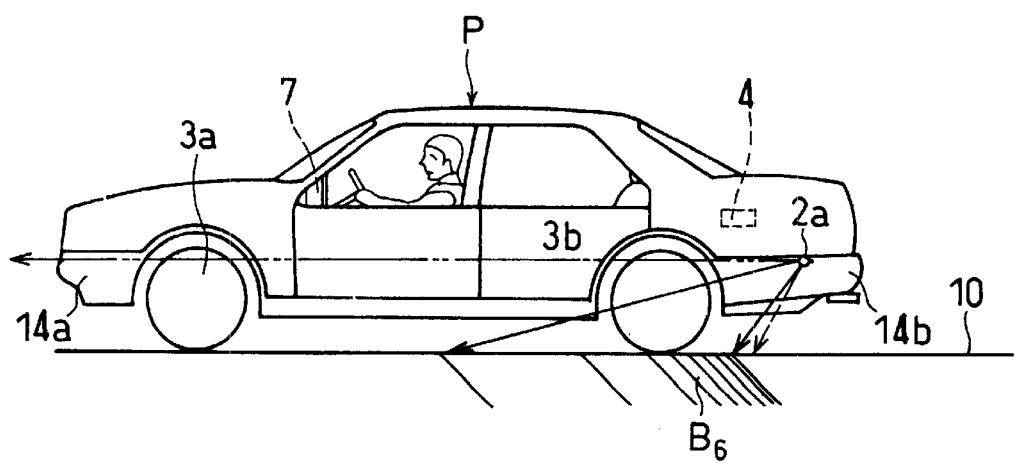
FIG. 15 is a side view illustrating a car mounting the CCD camera, relating to a sixth arrangement according to the first embodiment of the present invention.

FIGS. 14 and 15 are a plan and a side views illustrating a sixth example for mounting of the CCD camera 2a, respectively. The CCD camera 2a is mounted in the forward and downward directions about or at the rear bumper 14b.

Figure 16:
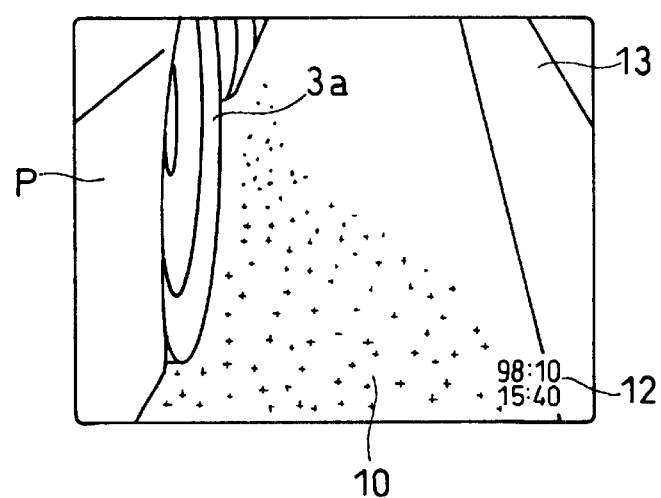
FIG. 16 is a view illustrating a displayed image on a display according to the CCD camera mounted to the car in the same way of the sixth arrangement of the present invention.

With the construction of the fifth and sixth examples described above, the CCD camera 2a can capture a secure image in relationship between the surface of the road 10 and the front or rear wheel. In addition, the CCD camera 2a allows a capture of an image of a traffic line employed as a traffic sign. In further addition, the CCD camera 2a can capture even an image of a track of the wheel 3a as shown in FIG. 16.

Embodiment 2

According to the first to sixth examples for mounting of the CCD camera 2a, the angle of view for the CCD camera 2a was directed to the image including the main capture of the surface of the road in vicinity of the wheel. However, the CCD camera 2a allows a captured image of wider field of view with use of a wide-angle lens. When the wide-angle lens is used for the CCD camera 2a, the image of scenery outside of the car P of the driver can be captured. The captured image includes an opposite side, a shoulder and a guard rail for example of the road, and other scene, and etc. The CCD camera 2a also partially captures the body of the car 2a. Thereby, the movement of the car P of the driver is clarified in relationship of the car P with the surface of the road as viewed objectively. That is, the CCD camera 2a used with the wide-angle camera allows the capture of image in wider field of view. The CCD camera 2a provides the capture of not only the image of the surface of the road under and at the side of the car P, but also the image of almost part of the side face of the car P.

Figure 17:
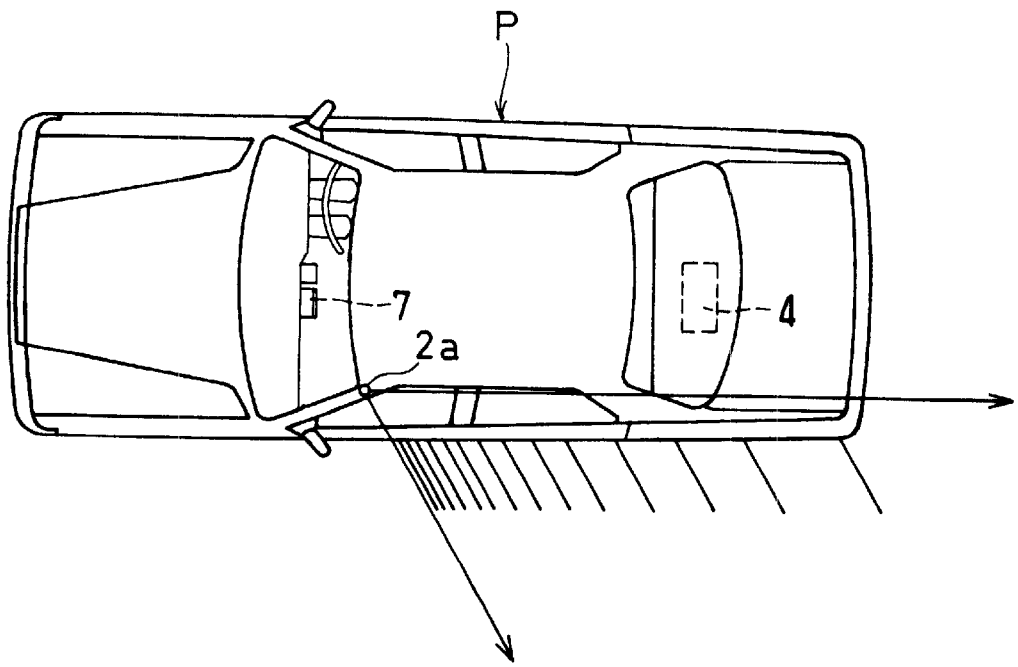
FIG. 17 is a top view illustrating a car mounting the CCD camera, relating to a first arrangement according to the second embodiment of the present invention.
Figure 18:
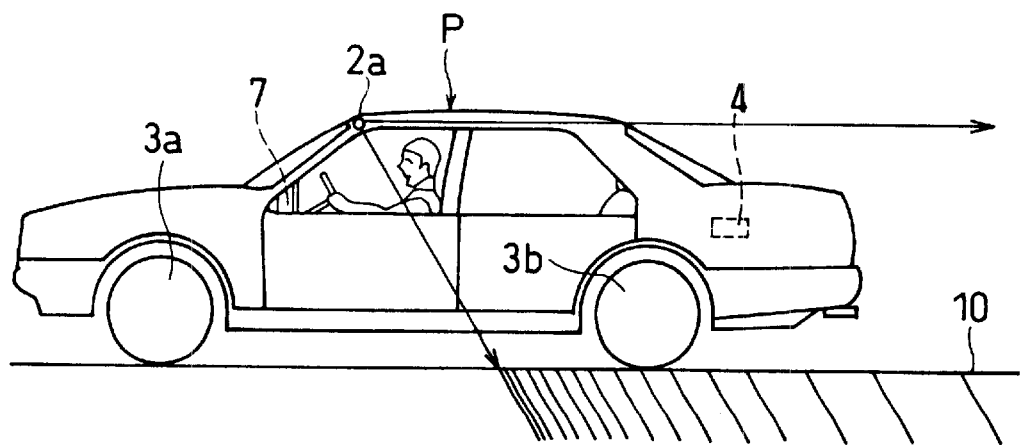
FIG. 18 is a side view illustrating a car mounting the CCD camera, relating to a first arrangement according to the second embodiment of the present invention.

Further description now will be made in relationship with the CCD camera 2a using the wide-angle lens. FIGS. 17 and 18 are a top plan and a side views illustrating an example for mounting of the CCD camera 2a used with the wide-angle lens, respectively. The CCD camera 2a with the wide-angle lens is mounted in the backward and downward directions on the side surface on the left side from the front portion of the roof surface of the car P, so that it also captures an image behind the running car P.

With the arrangement of FIGS. 17 and 18, the CCD camera 2a with the wide-angle lens allows the captures of not only the image of the surface of the road under and in vicinity of the car P of the driver (an area shown by oblique lines), but also the image of the scene behind the running car P (an area shown by continuous lines).

Figure 19:
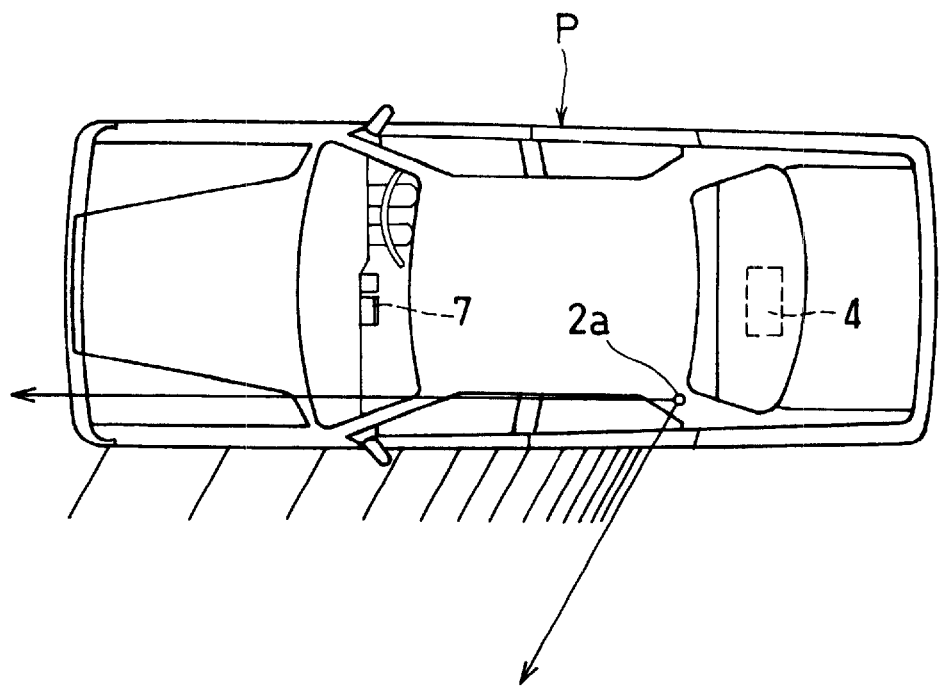
FIG. 19 is a top view illustrating a car mounting the CCD camera, relating to a second arrangement according to the second embodiment of the present invention.
Figure 20:
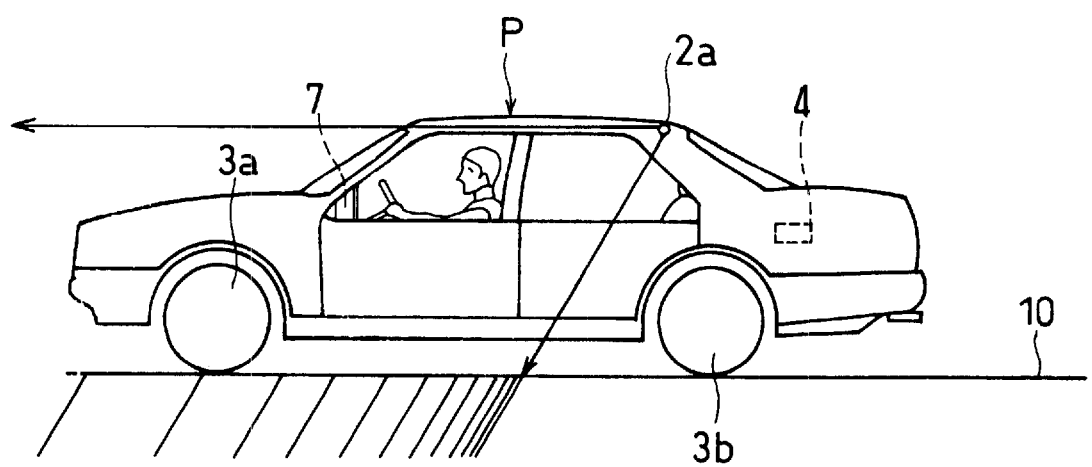
FIG. 20 is a side view illustrating a car mounting the CCD camera, relating to a second arrangement according to the second embodiment of the present invention.

FIGS. 19 and 20 are a top plan and a side views illustrating a second example for mounting of the CCD camera 2a used with the wide-angle lens, respectively. The CCD camera 2a is mounted in the forward and downward directions on the side surface on the left side from the rear portion of the roof of the car P of the driver.

With the arrangement of FIGS. 19 and 20, the CCD camera 2a with the wide-angle lens allows the capture of not only the image of the surface of the road under and in vicinity of the car P of the driver (an area shown by oblique lines), but also the image of the scene ahead of the running car P (an area shown by continuous lines).

Description now will be made in detail in relationship with the displayed image on the display 7a of the monitor device 7, when the CCD camera 2a with the wide-angle lens is used.

Figure 21:
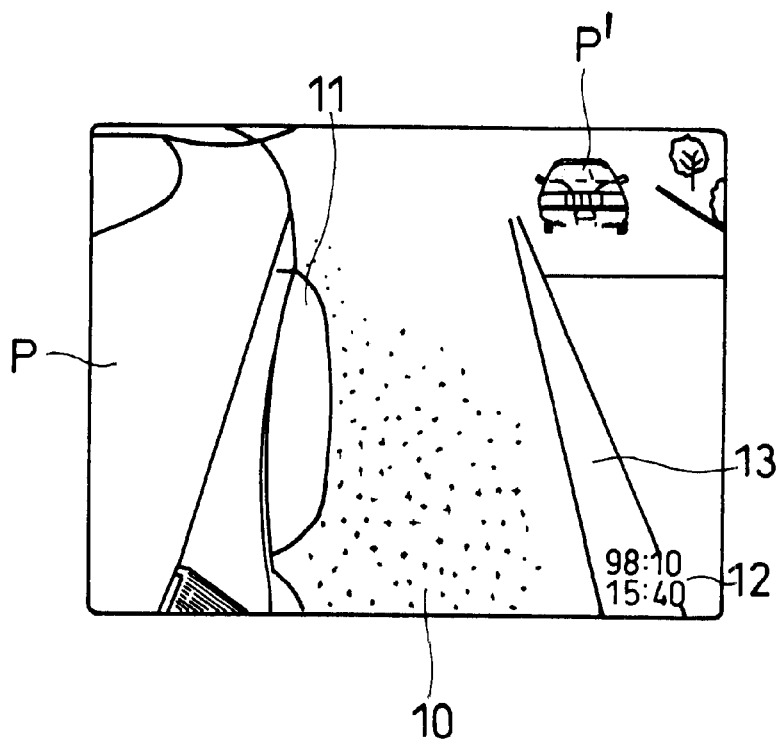
FIG. 21 is a view illustrating a displayed image on the display according to the CCD camera having a wide-angle lens, relating to the second embodiment of the present invention.

FIG. 21 is a view illustrating a displayed image on a display 7, when the CCD camera 2a with the wide-angle lens is used. The displayed image includes a part of the body of the car P, a part of the fender for covering the front wheel 3a of the car P, a part of the surface of the road 10, and the date/time information 12, similarly to FIG. 5. However, the display 7 shows a traffic line 13 adjacent to the car P of the driver, and a car P' on the traffic line 13 behind the car P of the driver.

As described above, the CCD camera 2a with the wide angle lens enables the capture of the image showing wider scenery outside of the car P of the driver, and the image showing the surface of the road in the area under and in the vicinity of the car P. Therefore, the CCD camera 2a will provide the captured image of the running state of other cars. The information on the running state of other cars can be utilized as an important piece of evidence after a traffic accident.

In addition, if a color camera is employed for the CCD camera 2a, a signal lamp of a signal captured in the image from will show the color as green, yellow, or red. Therefore, when the inquisition is made after the traffic accident, the captured image of the CCD camera 2a is proved as an important piece of evidence because the color of the signal lamp is identified and the running state of the objective cars are found. Thus, if a car of a driver is provided with the inventive system, the driver will have to pay attention to his driving.

Embodiment 3

Figure 22:
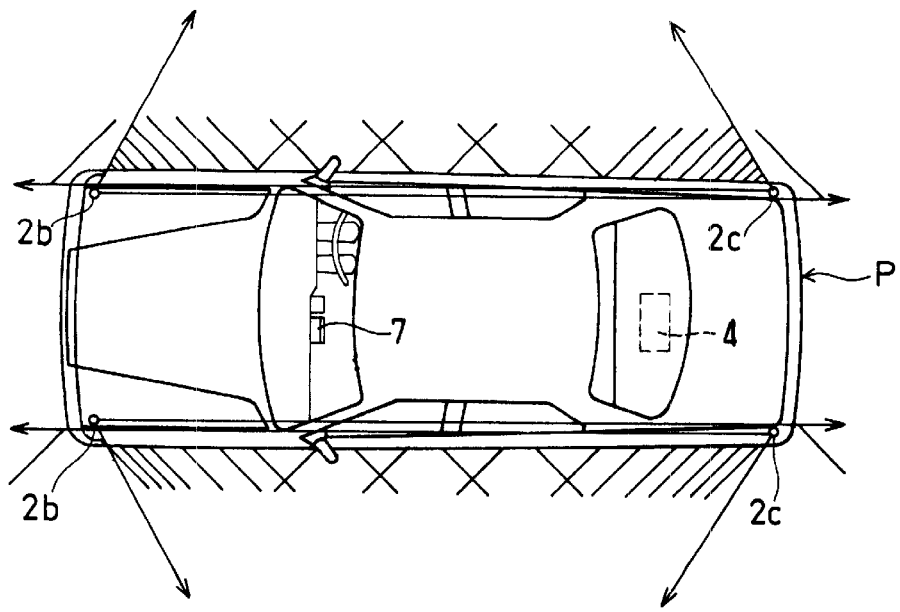
FIG. 22 is a top view illustrating a car mounting the plurality of CCD cameras, relating to a third embodiment of the present invention.
Figure 23:
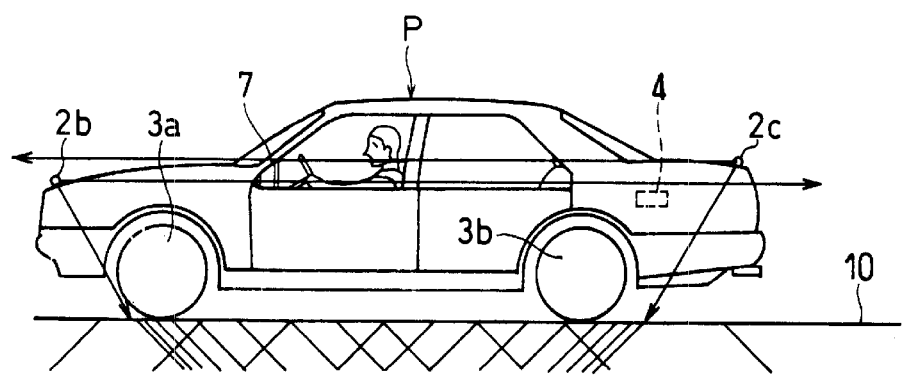
FIG. 23 is a side view illustrating a car mounting the plurality of CCD cameras, relating to a third embodiment of the present invention.

FIGS. 22 and 23 illustrate a car P, which is provided with a system having four capture devices. The capture devices 2 comprises a first, second, third, and fourth CCD cameras 2a. The car P has a first and second CCD cameras 2b, which are mounted on the side surface on opposite sides of the front portion thereof, and a third and fourth CCD cameras 2c, which are mounted on the side surface on opposite sides from the upper surface of the rear portion thereof. The first and second CCD cameras 2b are used as a rear vision camera, and directed to backward scenery, respectively. The third and fourth CCD cameras 2c are used as a front vision camera, and directed to forward scenery, respectively. The captured images of the first and second CCD cameras 2b include a vision of the surface of the road at the vicinal area B2 to the rear wheels of the car P, and preferably, a partial vision of the body of the car P, respectively. The captured images of the third and fourth CCD cameras 2c include the vision of the surface of the road at the vicinal area B2 to the front wheels of the car P, and preferably, a partial vision of the body of the car P, respectively. Accordingly, the first and third or second and fourth CCD cameras 2b, 2c are disposed at the suitable position of the car P opposite to each other, respectively.

With the construction of FIGS. 22 and 23, the system enables captured images showing a relationship between opposite sided surfaces of the body of the car P and the surface of the road under and in vicinity of the car P. The system also enables captured images of wider range of frontward and backward visions with respect to the driving car P of the driver. Thus, the scenery of the running state of the car P can be captured and recorded from every angle of view of the four CCD cameras.

According to the car P of FIGS. 22 and 23, even though one of the first and third CCD cameras 2b, 2c or the second and fourth CCD cameras 2b, 2c is damaged, the image of the side surface of the car P is captured or recorded after the damage. Because the first or second CCD cameras 2b capture vision of same area as one of the third or fourth CCD cameras 2c with respect to the side of the car P. Thus, for example, when the lens of the first CCD camera 2b gets soiled, the third CCD camera 2c allows the reliable capture of the vision on the side of the car P. Therefore, even if each of the CCD cameras is not provided with a cleaning device, the running state of the car P of the driver is continuously recorded. It will be understood that the driver of the car P has to take attention into his driving.

Figure 24:
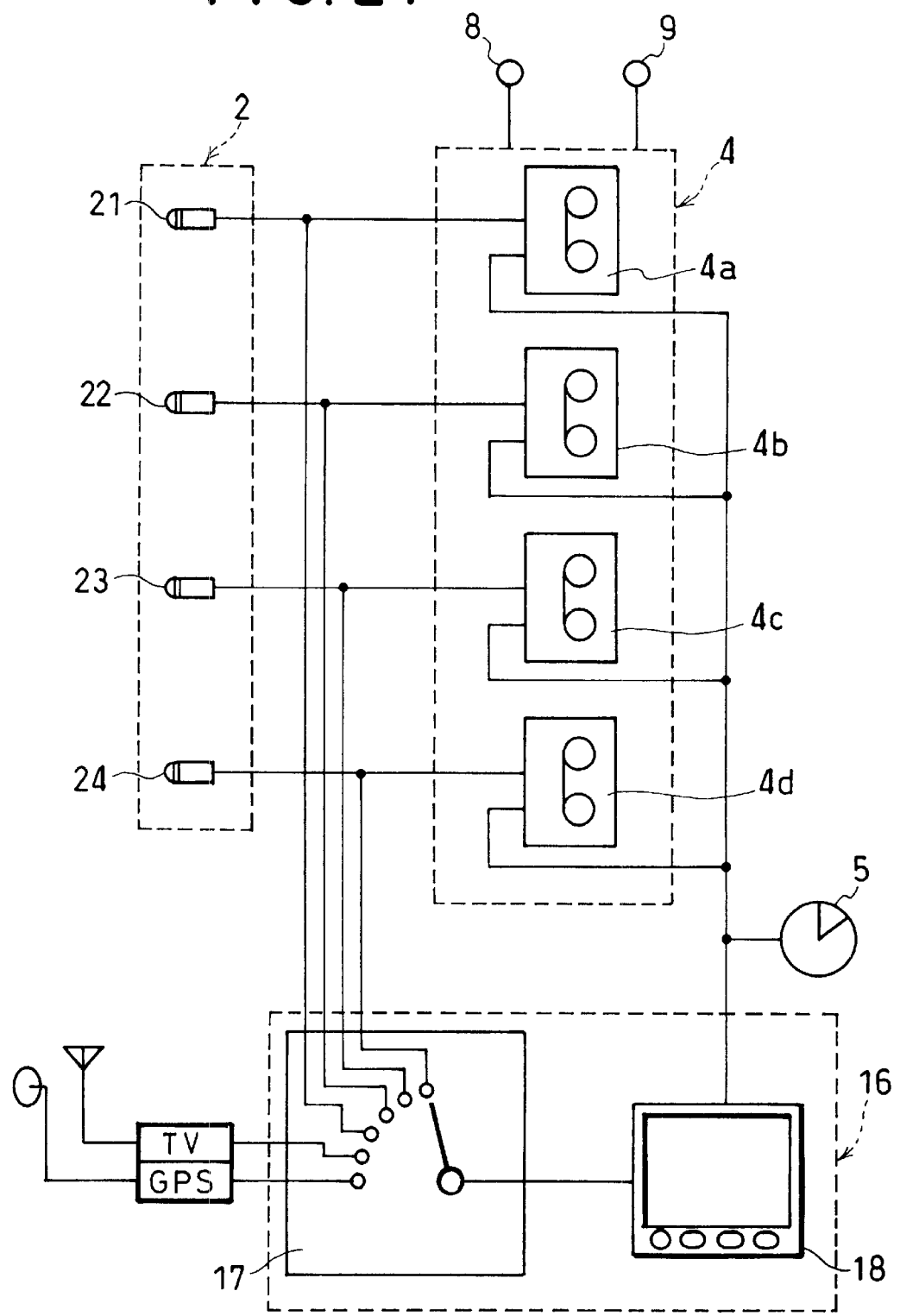
FIG. 24 is a block diagram of a car-mounted image record system, relating to a first construction according to a third embodiment of the present invention.

FIG. 24 is a view illustrating a car-mounted system according to the third embodiment of the present invention. The car-mounted system includes a plurality of image capture devices 21 to 24, and the image record unit 4. The capture devices 21 to 24 corresponds to the above four CCD cameras 2b and 2c mounted at the suitable position of the opposite sides of the car P, respectively. Each of the image capture devices 21 to 24 captures both of the images of the running car P and the backward or forward vision of the running car P, and the image record unit 4 record the captured images of the image capture devices 21 to 24, respectively. Each of the image record devices 4 has a record medium provided therein for recording or storing the captured image. The car-mounted system also includes date/time-information-record device 5 for recording information on date and time so that the date/time information and the captured images are displayed on a display of a monitor device 16. The monitor device 16 is disposed on the surface of the dashboard, for example of the car P.

The monitor device 16 comprises a display 18, and a selection switch 17 for selecting the displayed image on a display 18 from the captured image of the CCD cameras 21 to 24, or from an external image signal output device such as a TV image, and a displayed image for a navigating system. Therefore, the display 18 can display either of the captured image, TV image, or the displayed image for the navigating system in accordance with the operation of the selection switch 17.

When the image record device of the image record unit 4 actuates through the manual operation element 8, or the automatic drive element 9 driven by starting the engine, for example, the captured images of the CCD cameras 21 to 24 are recorded on and stored in the image record devices 4a to 4d, respectively.

As clarified from the above description on the first embodiment, when the predetermined time passed after the stop of the engine of the car P, the car-mounted image record system stops capturing, displaying, and recording or storing operations. If the car-mounted record system is operated through the manual operation element 8 before the start-up of the engine, the operation of the car-mounted system is stopped by the release of the manual operation element 8.

When the car P of the driver runs, the driver manually operates the display 18 so as to display the captured images of the rear vision camera 2b mounted at the front portion of the body of the car P. Therefore, the driver can know information on the backward scenery on the right and left side of the car P. In addition, the driver can examine the capture or displaying state of the car-mounted image record system and check weather there is any trouble with the system. As a result, the car-mounted image record system will be more effectively operated.

As clarified from the above description, firstly, since the captured images of the image capture devices 21 to 24 are recorded or stored in the image record devices of the image record unit 4, respectively, the evidence of the accident is exactly proved. Secondly, since each of the captured images is displayed on the display 18 with the date/time information written by the date/time-information record device, the movement of the car P is exactly found. Even if the plural captured images are reproduced at different time to each other, the movement of the car P can be easily found from the date/time information displayed on the display 18.

Figure 25:
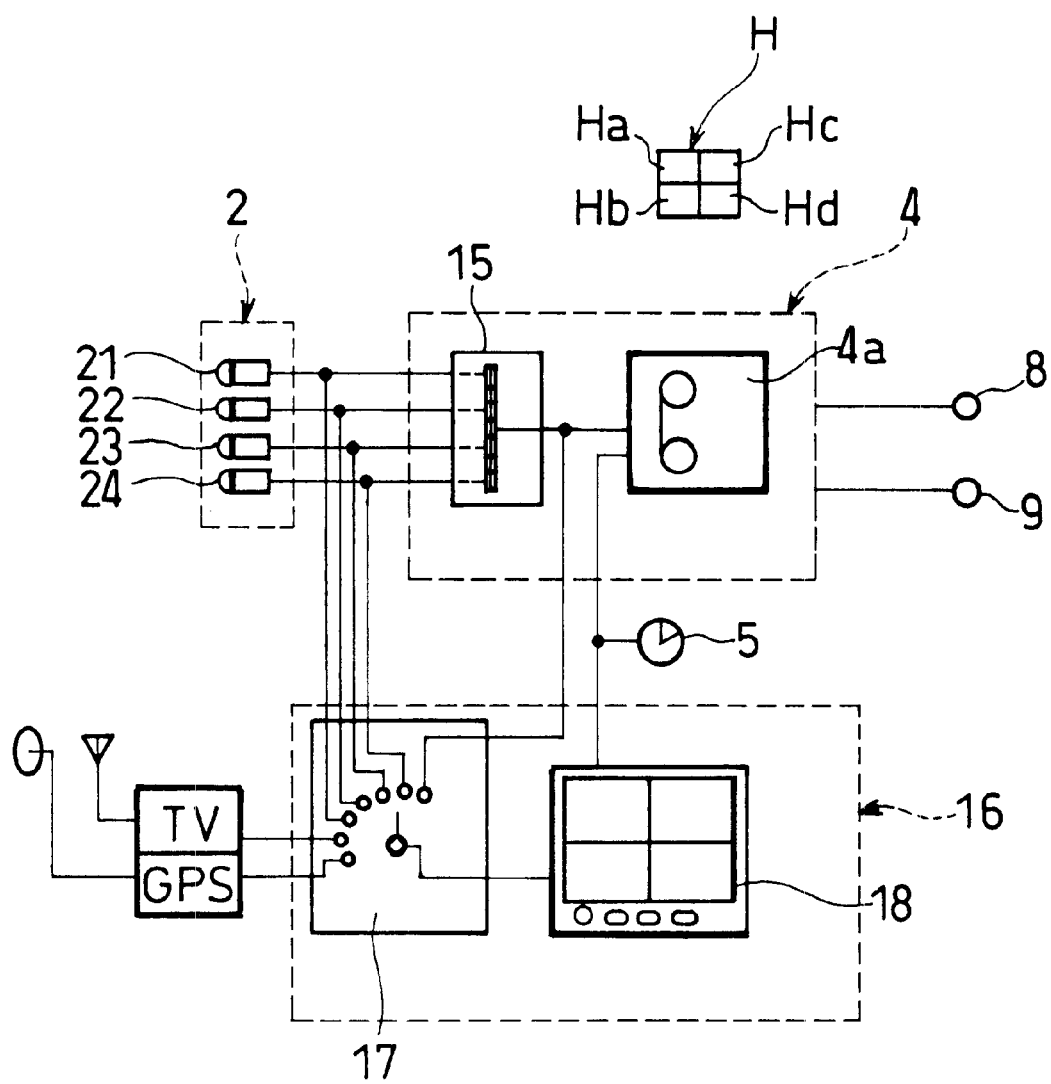
FIG. 25 is a block diagram of a car-mounted image record system, relating to a second construction according to a third embodiment of the present invention.

FIG. 25 is a view illustrating the car-mounted image record system having another construction. A rectangular block H is a scope of a display 18. The rectangular scope H is divided into four square areas Ha, Hb, Hc and Hd with equal size. Numeral reference 2 is an image capture unit 2, which comprises image capture devices 21 to 24. The captured images of the image capture devices 21 to 24 are displayed on the areas Ha, Hb, Hc and Hd in the scope of the display 18, respectively.

The image capture unit 2 is connected to an image record unit 4 and a monitor unit 16. The image record unit 4 includes a synthetic adapter 16, and an image record device 4a.

The composite adapter 16 is connected to the image capture unit 2 so as to produce a composite image of the captured images of the image capture devices 21 to 24. The composite image is recorded on or stored in the image record device 4a connected to the composite adapter 15.

Furthermore, The image record unit 4 is connected to a manual operation element 8, and an automatic drive element 9. Therefore, the image record unit 4 is also operated through the manual operation element 8, or the automatic drive element 9 driven by the start up of the engine of the car P, in the same way as other vision systems for car described above. However, in the car-mounted image record system, the captured images of the image capture devices 21 to 24 are compounded, so that the composite image is recorded on the record medium of the image record device 4a or stored in the image record device 4a.

The monitor device 16 includes a selection switch 17, and a display 18. The selection switch 17 of the monitor device 16 is connected to each of the image capture devices 21 to 24, TV unit, and a navigation unit. The display 18 of the monitor device 16 is connected to the selection switch 17, so that either of images of the image capture devices 21 to 24, a TV unit, and a navigation unit is displayed on the display 18 of the monitor device 16 through the selection switch 17. In addition, the selection switch 17 is connected to the composite adapter 15. Thereby, the composite image is displayed on the display 18 of the monitor device 16.

As described above, the monitor device 16 is disposed on for example, the surface of the dashboard of the car P. Therefore, the driver of the car P can select either of images of each of the image capture devices 21 to 24, TV unit, a navigation unit, and the composite adapter 15, by the selection switch 17 of the monitor device 16. Thereby, since the captured images or composite image are displayed on the display 18 of the monitor device 16 through the selection switch, the driver can know information on the vision on the right and left sides of the car P. Then, the driver can check the capturing or recording state of the car-mounted image record system.

Furthermore, since the captured images of the image capture devices 21 to 24 are compound by the composite adapter 15, they are recorded on the record medium of the single record device 4a or stored in the single record device 4a. Therefore, the image record unit 4 can be formed in smaller size than that of other car-mounted image record system of the present invention described above. Further, additionally, it will be understood that the record device of the image record unit 4 may be accommodated in the protective box with excellent mechanical strength, as described above.

Moreover, since the captured images are simultaneously displayed in same scope of the display 18, even if one of the image capture devices 21 to 24 had a breakdown during driving of the driver, for example, the driver can immediately know the information on the vision on the right and left sides of the car P by the rest of the image capture device. Therefore, the driver can take an attention into safe drive.

Referring again with FIG. 25, numeral reference 5 is a date/time information write device. The information on date and time is also written in the captured image of the image capture device in the same way of other embodiments. In the case of this embodiment, the information is written in each of the captured images of the image capture devices 21 to 24 through the date/time information write device 5.

The car-mounted image record system may be provided with devices for additionally writing information on running speed, a brake, a blinker, and etc. In addition, the car-mounted image record system may be provided with a microphone, so that the sound of crash, brake, and horn, a music of a signal for person of advanced age and etc. can be recorded or stored. These record sounds allow more correct inspection of the traffic accident, even though all the image capture devices 21 to 24 had a breakdown, or were deviated from the correct location by crash of the car P.

The above description on the third embodiment was directed to four image capture devices. However, four image capture devices should not be construed as limiting number. For example, when four image capture devices have still blind spots around the car P, the number of the image capture device may be increased, although few of overlaps of the captured images are caused. In addition, it is understood that the number and location for mounting of the image capture device depends on a form of the body of a car.

Accordingly, the arrangement of the image capture devices 21 to 24 may be such that the image capture device 2 is given in the description on the above first and second embodiments. In this case, four image capture devices 2 are provided at the suitable position of the car P in the symmetric arrangement with respect to the right and left sides or the front and rear sides.

The descriptions on the image capture devices were directed to the CCD camera, relating to the above embodiments. However, it should be observed that the image capture devices are not limited to the CCD camera.

Two image capture devices may be provided at same location of the car side by side. For example, two image capture devices are directed in different direction to each other, or have different blind spots to each other. For example, Two image capture devices comprises a vision camera for night, and a vision camera for daylight. For example, one of two image capture devices is a spare camera.

As described above, the present invention enables capture and record of image in relationship between the car of the driver and the surface of the road in vicinity of the car, which is taken seriously by the inspection of a collision. Therefore, since the recorded information is reproduced, the movement of the car of the driver is exactly proved.

The recorded information will contribute to the decrement of the traffic accident as well as the inspection. Because when the recorded information is reproduced after the accident, it can be amply proved weather the driver did safe driving or not. Therefore, the car-mounted image record system ensures safe driving of the car driver. As a result, the car-mounted image record system more effectively leads the number of the traffic accident to the decrease.

When the driver installs the car-mounted image record system in his car, it is proved that the driver make a declaration of safe driving, while he endeavors to do safe driving. If a safe driver has an accident, the recorded information of the car-mounted image record system will be proof of safe driving for the driver. Therefore, the car-mounted image record system ensures the security of the safe driver.

What is claimed is:

1. A car-mounted image record system comprising: image capture means provided on a body of a car for capturing an image of scenery outside of the car including at least an image of a portion of the car and a surface of a road extending from directly below the portion of the car and directly adjacent thereto; image record means provided at a suitable position of the car for recording the captured image; image display means provided in the interior of the car for displaying the captured image or the recorded image and having a display and a switch; manual operation means connected to the image record means for manually operating the image record means; automatic drive means connected to the image record means for causing the image record means to be automatically driven in response to the start-up of an engine of the car; and time/date information write means arranged between the image record means and the image display means for writing information on date and time, the information on date and time being displayed on the display means with the captured image, while the captured image with the information on date and time is recorded by the image record means.

2. The car-mounted image record system defined in claim 1, wherein said image capture means includes cleaning means for cleaning a lens of the image capture means.

3. The car-mounted image record system as defined in claim 1, wherein the image capture means for capturing the image outside of the car is provided in the backward and downward directions on the upper surface at the front portion of the car, the image capture means protruding sideward from the upper surface, the captured image including images of a surface of a road in the vicinity of a front wheel of the car and a part of a body of the car.

4. The car-mounted image record system defined in claim 3, wherein said image capture means has angle of view at 50 to 85 degrees.

5. The car-mounted image record system as defined in claim 1, wherein the image capture means for capturing the image of vision outside of a car is provided in the forward and downward directions on the upper surface at the rear portion of the car, the image capture means protruding sideward from the upper surface, the captured image including images of a surface of a road in the vicinity of a front wheel of the car and a part of a body of the car.

6. The car-mounted image record system defined in claim 5, wherein said image capture means has angle of view at 50 to 85 degrees.

7. The car-mounted image record system defined in claim 1, wherein the image capture means for capturing the image of vision outside of a car is provided in the forward and downward directions on the side surface of a side mirror, the captured image including images of a front wheel, a surface of a road in vicinity of the front wheel, and a part of a body of the car.

8. The car-mounted image record system defined in claim 7, wherein said image capture means has angle of view at 50 to 85 degrees.

9. The car-mounted image record system defined in claim 1, wherein the image capture means for capturing the image of vision outside of a car is provided in the backward and downward directions on a side surface adjoining to the upper surface at the front portion of the roof of the car, the captured image including images of a part of a side surface of the car, and a surface of a road extending from the area under the car to the vicinal area around the car.

10. The car-mounted image record system defined in claim 9, wherein said image capture means has angle of view at 50 to 85 degrees.

11. The car-mounted image record system defined in claim 1, wherein said image capture means for capturing the image of vision outside of a car is provided in the forward and downward directions on a side surface adjoining to the upper surface at the rear portion of the roof of the car, the captured image including images of a part of a side surface of the car, and a surface of a road extending from the area under the car to the vicinal area around the car.

12. The car-mounted image record system defined in claim 11, wherein said image capture means has angle of view at 50 to 85 degrees.

13. The car-mounted image record system defined in claim 1, wherein said image capture means for capturing the image of vision outside of a car is provided in the backward and downward directions on a side surface of the car, the side surface being at the vicinal portion to a fender of a front wheel of the car, the captured image including images of a part of the side surface of the car, and the surface of the road extending from the area under the car to the area in vicinity of the car.

14. The car-mounted image record system defined in claim 13, wherein the image capture means has angle of view at 50 to 85 degrees.

15. The car-mounted image record system defined in claim 1, wherein said image capture means for capturing the image of vision outside of a car is provided in the backward and downward directions on the side surface adjoining to the upper surface at the front portion of a roof of the car, the captured image including images of a part of a side surface of the car, and a surface of a road extending from the area under the car to the area in vicinity of the car.

16. The car-mounted image record system defined in claim 15, wherein said image capture means has angle of view at 50 to 85 degrees.

17. The car-mounted image record system defined in claim 1, wherein said image capture means for capturing the image of vision outside of a car is provided in the forward and downward directions on the side surface adjoining to the upper surface at the rear portion of a roof of the car, the captured image including images of a part of a side surface of the car, and the surface of the road extending from the area under the car to the area in vicinity of the car.

18. The car-mounted image record system defined in claim 17, wherein said image capture device has angle of view at 50 to 85 degrees.

19. The car-mounted image record system defined in claim 1, wherein said image capture means includes a pair of image capture means, said paired image capture means are mounted in the backward and downward directions on the upper surface at the front portion of the car, and in the forward and downward directions on the upper surface at the rear portion of the car, respectively, each of the image capture devices protruding form the upper surface, the captured image including images of a part of a side surface of the car, a surface of a road extending from the area under the car to the area in vicinity of the car, and a backward vision from the car.

20. The car-mounted image record system defined in claim 19, wherein said image capture means has angle of view at 50 to 85 degrees.

21. The car-mounted image record system defined in claim 1, wherein the image capture means includes a pair of image capture means, one of the image capture means is mounted to a side mirror of the car and oriented in the forward and downward directions of the car so that the capture image includes a front wheel of the car, a surface of a road directly adjacent to the front wheel, and a part of a body of the car.

22. The car-mounted image record system defined in claim 21, wherein said image capture means has angle of view at 50 to 85 degrees.

23. The car-mounted image record system defined in claim 1, wherein said image capture means includes a pair of image capture means, said paired image capture means are mounted in the backward and downward directions on a side surface adjoining to the upper surface at the front portion of the roof of the car, and in the forward and downward directions on a side surface adjoining to the upper surface at the rear portion of the roof of the car, the captured image including images of a part of a side surface of the car, and a surface of a road extending from the area under the car to the vicinal area around the car.

24. The car-mounted image record system defined in claim 23, wherein said image capture means has angle of view at 50 to 85 degrees.

25. The car-mounted image record system defined in claim 1, wherein said image capture means includes a pair of image capture means, said paired image capture means are provided in the backward and downward directions on a side surface of the car, the side surface being at the vicinal portion to a fender of a front wheel of the car, and in the forward and downward directions on the side surface of the car, the side surface being at the vicinal portion to a back bumper, the captured image including images of a part of the side surface of the car, and the surface of the road extending from the area under the car to the area in vicinity of the car.

26. The car-mounted image record system defined in claim 1, wherein the image capture means has angle of view at 50 to 85 degrees.

27. A car-mounted image record system defined in claim 1, wherein the image capture means includes a pair of image capture means, one of which is oriented in the backward and downward directions of the car and is mounted proximate to a door of the car, and the other of which is oriented in the forward and downward directions of the car and is mounted proximate a door of the car, the image capture means including a wide-angle lens, so that the captured image includes a part of a side surface of the car, a surface of the road extending from directly below the car to the area in vicinity of the car, and scenery behind the car.

28. The car-mounted image record system defined in claim 27, wherein the image capture device has angle of view at 50 to 85 degrees.

29. The car-mounted image record system defined in claim 1, wherein said image record means comprises two image record devices; and a protective box having sufficient mechanical strength to protect one of the image record devices in the event of a car accident.

30. The car-mounted image record system defined in claim 1, wherein the image capture means is mounted to a door of the car and oriented in the backward and downward directions of the car, the image capture means including a wide-angle lens, so that the captured image includes a part of a side surface of the car, a surface of the road extending from directly below the car to the area directly adjacent thereto, and scenery behind the car.

31. The car-mounted image record system defined in claim 30, wherein said image capture mans is provided in the forward and downward directions at the vicinal position form a door of the car, said image capture device including a wide-angle lens, the captured image including images of a part of a side surface of the car, a surface of a road extending from the area under the car to the area in vicinity of the car, and a forward vision from the car.

32. A car-mounted image record system comprising: a plurality of image capture means provided on a body of a car for capturing an image of scenery outside of the car including at least an image of a portion of the car and a surface of a road extending from directly below the portion of the car and directly adjacent to the portion of the car, each image capture means being paired with another image capture means, and an image captured by a respective image capture means overlapping with an image captured by another image capture means; image record means provided at a suitable position of the car for recording the captured images; image display means provided in the interior of the car for displaying the captured images and having a display and switch means, the switch means being connected with each of the image capture means and one or more external image signal output devices for enabling selective display of the images captured by the respective image capture means or external image signal output devices on the display of the image display means; manual operation means connected to the image record means for manually operating the image record means; automatic drive means connected to the image record means for causing the image record means to be automatically driven in response to the start-up of an engine of the car; and time/date information write means arranged between the image record means and the image display means, the time/date information means for additionally writing information on date and time, the information on date and time being displayed on the said display with the captured image, while the captured image with the information on date and time is recorded by the image record means.

33. The car-mounted image record system defined in claim 32, wherein the image display means displays all of the images captured by the plurality of the image capture means, a scope of the display being divided into plural areas of equal size, the respective images being displayed on the plural areas of the display.

34. The car-mounted image record system defined in claim 32, said system further including a composite means for compounding images captured by the plurality of image capture means, the composite means being connected to said image record means and said switch of the image display means, the record means composite comprising a single construction, the record means recording the composite image, said display of the image display means displaying the composite image.

35. The car-mounted image record system defined in claim 32, wherein one of a pair of the image capture means is mounted on an upper surface of the car at a front portion of the car and is oriented in the backward and downward directions of the car, and the other one of the pair is mounted on the upper surface at a rear portion of the car and is oriented in the forward and downward directions of the car, each of the image capture means protruding from the upper surface, so that the captured image includes a part of a side surface of the car, a surface of the road extending from directly below the car to the area directly adjacent thereto, and scenery behind the car.

36. The car-mounted image record system defined in claim 35, wherein said image capture means has angle of view at 50 to 85 degrees.

37. The car-mounted image record system defined in claim 32, wherein one of said paired image means device is provided in the forward and downward directions on the side surface of a side mirror, the captured image including images of a front wheel, a surface of a road in vicinity of the front wheel, and a part of a body of the car.

38. The car-mounted image record system defined in claim 37, wherein said image capture means has angle of view at 50 to 85 degrees.

39. The car-mounted image record system defined in claim 32, wherein the pair of the image capture means are mounted in the backward and downward directions on a side surface adjoining to the upper surface at the front portion of the roof of the car, and in the forward and downward directions on a side surface adjoining to the upper surface at the rear portion of the roof of the car, the captured image including images of a part of a side surface of the car, and a surface of a road extending from the area under the car to the vicinal area around the car.

40. The car-mounted image record system defined in claim 39, wherein said image capture means has angle of view at 50 to 85 degrees.

41. The car-mounted image record system defined in claim 32, wherein the pair of image capture means are provided in the backward and downward directions on a side surface of the car, the side surface being at the vicinal portion to a fender of a front wheel of the car, and in the forward and downward directions on the side surface of the car, the side surface being at the vicinal portion to a back bumper, the captured image including images of a part of the side surface of the car, and the surface of the road extending from the area under the car to the area in vicinity of the car.

42. The car-mounted image record system defined in claim 41, wherein the image capture device has angle of view at 50 to 85 degrees.

43. The car-mounted image record system defined in claim 32, wherein one of a pair of the image capture means is mounted proximate a door of the car and is oriented in the backward and downward directions of the car, and the other is mounted proximate a door of the car and is oriented in the forward and downward directions of the car, the image capture means including a wide-angle lens, so that the capture image-includes a part of a side surface of the car, a surface of a road extending from directly below the car to the area in vicinity of the car, and scenery behind the car.

44. The car-mounted image record system defined in claim 43, wherein the image capture device has angle of view at 50 to 85 degrees.

45. The car-mounted image record system defined in claim 32, wherein the image capture means is mounted proximate a door of the car and is oriented in the forward and downward directions of the car, the image capture means including a wide-angle lens, so that the captured image includes a part of a side surface of the car, a surface of a road extending from directly below the car to the area in vicinity of the car, and scenery forward of the car.

46. The car-mounted image record system defined in claim 32, wherein said image record means comprises two image record devices; and a protective box having sufficient mechanical strength to protect one of the image record devices in the event of a car accident.

47. A vehicle-mounted image recording system comprising: one or more cameras mounted to a body of a vehicle for capturing an image of scenery outside the vehicle including an image of a portion of the vehicle and a surface of a road in the vicinity of the portion of the vehicle; a recording device provided in the vehicle for recording the captured image along with a date and time of the captured image, the recording device for continuously recording over captured images but permanently retaining recorded images immediately before, during and after an accident involving the vehicle; and a switch connected to the recording device for causing the recording device to start recording the image when an engine of the vehicle is started.

48. A vehicle-mounted image recording system according to claim 47; further comprising a display provided in the vehicle for displaying images captured by the one or more cameras and the date and time of the captured images.

49. A vehicle-mounted image recording system according to claim 47; further comprising a manual operation switch connected to the recording device for manually turning on the recording device to record the captured images.

50. A vehicle-mounted image recording system according to claim 47; further comprising a lens cleaning device for cleaning a lens of the one or more cameras.

51. A vehicle-mounted image recording system according to claim 47; wherein the one or more cameras are directed so that the captured image includes a wheel of the vehicle and the surface of the road in the vicinity of the wheel.

52. A vehicle-mounted image recording system according to claim 51; wherein selected ones of the one or more cameras have a wide angle lens so that the captured images include scenery in a direction of forward or reverse movement of the vehicle.

53. A vehicle-mounted image recording system according to claim 47; wherein the one or more cameras have an angle of view within the range of 50 to 85 degrees.

54. A vehicle-mounted image recording system according to claim 47; wherein the one or more cameras comprise one or more pairs of cameras mounted to opposite lateral sides of the vehicle at a front or rear portion of the vehicle.

55. A vehicle-mounted image recording system according to claim 47; wherein the one or more cameras comprise one or more pairs of cameras, each pair mounted to a lateral side of the vehicle at front and rear portions of the vehicle.

56. A vehicle-mounted image recording system according to claim 47; wherein the one or more cameras comprise one or more pairs of cameras arranged such that images captured by cameras of a respective pair overlap.

57. A vehicle-mounted image recording system according to claim 56; further comprising a display for displaying the captured images; a first switch connected to each of the cameras for selecting one or more of the images captured by the cameras for display; a second switch connected to the recording device for manually turning on the recording device; and a third switch connected to the recording device for causing the recording device to be automatically driven in response to the start-up of an engine of the vehicle.

58. A vehicle-mounted image recording system according to claim 57; wherein the display is divided into a plurality of display areas of equal size each for displaying an image captured by a respective camera.

\* \* \* \* \*